(12) United States Patent
Yoshino

(10) Patent No.: US 9,300,878 B2
(45) Date of Patent: Mar. 29, 2016

(54) IMAGING APPARATUS AND METHOD FOR CONTROLLING IMAGING APPARATUS

(71) Applicant: Seiko Epson Corporation, Tokyo (JP)

(72) Inventor: Yasunori Yoshino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/595,188

(22) Filed: Jan. 12, 2015

(65) Prior Publication Data

US 2015/0256759 A1   Sep. 10, 2015

(30) Foreign Application Priority Data

Mar. 5, 2014   (JP) .................................. 2014-043119

(51) Int. Cl.
*H04N 5/232*   (2006.01)
*H04N 5/262*   (2006.01)

(52) U.S. Cl.
CPC ....... *H04N 5/23296* (2013.01); *H04N 5/23212* (2013.01); *H04N 5/23293* (2013.01); *H04N 5/2628* (2013.01)

(58) Field of Classification Search
CPC .................. H04N 5/23293; H04N 5/23296
See application file for complete search history.

(56) References Cited

U.S. PATENT DOCUMENTS

| 8,139,118 | B2 | 3/2012 | Yoshida | |
| 2010/0277620 | A1* | 11/2010 | Iijima | H04N 5/23232 348/240.1 |
| 2014/0368719 | A1* | 12/2014 | Kaneko | H04N 5/23216 348/333.02 |

FOREIGN PATENT DOCUMENTS

| JP | 10-229515 A | 8/1998 |
| JP | 2005-311926 A | 11/2005 |

* cited by examiner

*Primary Examiner* — James Hannett
(74) *Attorney, Agent, or Firm* — ALG Intellectual Property, LLC

(57) ABSTRACT

An imaging apparatus includes an imaging unit having an optical zoom mechanism that optically changes magnification and capturing an image, an image processing unit that performs image processing including an electronic zoom process that enlarges part of the image captured with the imaging unit by cutting the image, an input unit that accepts an input that specifies an output range of the image, and a control unit that controls the imaging unit and the image processing unit, and when the output range is specified, the control unit causes the imaging unit to perform imaging at a magnification determined in accordance with the amount of deviation of the output range from the center of a viewing angle of the imaging unit and causes the image processing unit to carry out the electronic zoom process that enlarges the image by cutting the output range from an image captured at the magnification.

5 Claims, 6 Drawing Sheets

IMAGING APPARATUS AND METHOD FOR CONTROLLING IMAGING APPARATUS

CROSS-REFERENCE TO RELATED APPLICATION

The entire disclosure of Japanese Patent Application No. 2014-043119, filed Mar. 5, 2014 is expressly incorporated by reference herein.

BACKGROUND

1. Technical Field

The present invention relates to zooming operation performed by an imaging apparatus.

2. Related Art

Zooming operation performed by an imaging apparatus includes optical zooming and electronic zooming (also called digital zooming). In general, optical zooming less degrades image quality than electronic zooming. Optical zooming is, however, in principle incapable of shifting the center of an image in zoom-in operation. To shift the center of an image in zoom-in operation, electronic zooming needs to be performed to enlarge an image or a camera body needs to be moved as described in JP-A-10-229515 and JP-A-2005-311926.

Available mechanisms for moving a camera body are complicated or expensive and therefore inadequate to be used in some cases. Further, when the imaging apparatus is a digital camera or any other apparatus grasped by a user's hand, the user himself/herself may move the imaging apparatus to shift the center of an image, whereas when the imaging apparatus is not held by a user, it may be cumbersome to move the imaging apparatus in some cases.

SUMMARY

An advantage of some aspects of the invention is to provide zooming operation performed by an imaging apparatus without movement of the imaging apparatus and with degradation in image quality suppressed.

An aspect of the invention provides an imaging apparatus including an imaging unit having an optical zoom mechanism that optically changes magnification and capturing an image, an image processing unit that performs image processing including an electronic zoom process that enlarges part of the image captured with the imaging unit by cutting the image, an input unit that accepts an input that specifies an output range of the image, and a control unit that controls the imaging unit and the image processing unit, and when the output range is specified, the control unit causes the imaging unit to perform imaging at a magnification determined in accordance with the amount of deviation of the output range from the center of a viewing angle of the imaging unit and causes the image processing unit to carry out the electronic zoom process that enlarges the image by cutting the output range from an image captured at the magnification.

According to the imaging apparatus described above, zooming operation can be performed without movement of the imaging apparatus and with degradation in image quality suppressed.

Among combinations of an optical zoom magnification and an electronic zoom magnification that specify a predetermined magnification by which the image is enlarged, the control unit may control each of the imaging unit and the image processing unit by determining a combination that maximizes the optical zoom magnification.

Alternatively, among combinations of the optical zoom magnification and the electronic zoom magnification that specify a predetermined magnification by which the image is enlarged, the control unit may control each of the imaging unit and the image processing unit by determining a combination that minimizes the electronic zoom magnification.

According to the configurations described above, among the plurality of combinations, the combination that minimizes degradation in image quality resulting from the electronic zooming can be used to enlarge an image.

The imaging apparatus may further include an output control unit that outputs an image superimposing a pointer that allows acceptance of the input on the image captured with the imaging unit.

According to the configuration, a variety of output ranges can be readily specified.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
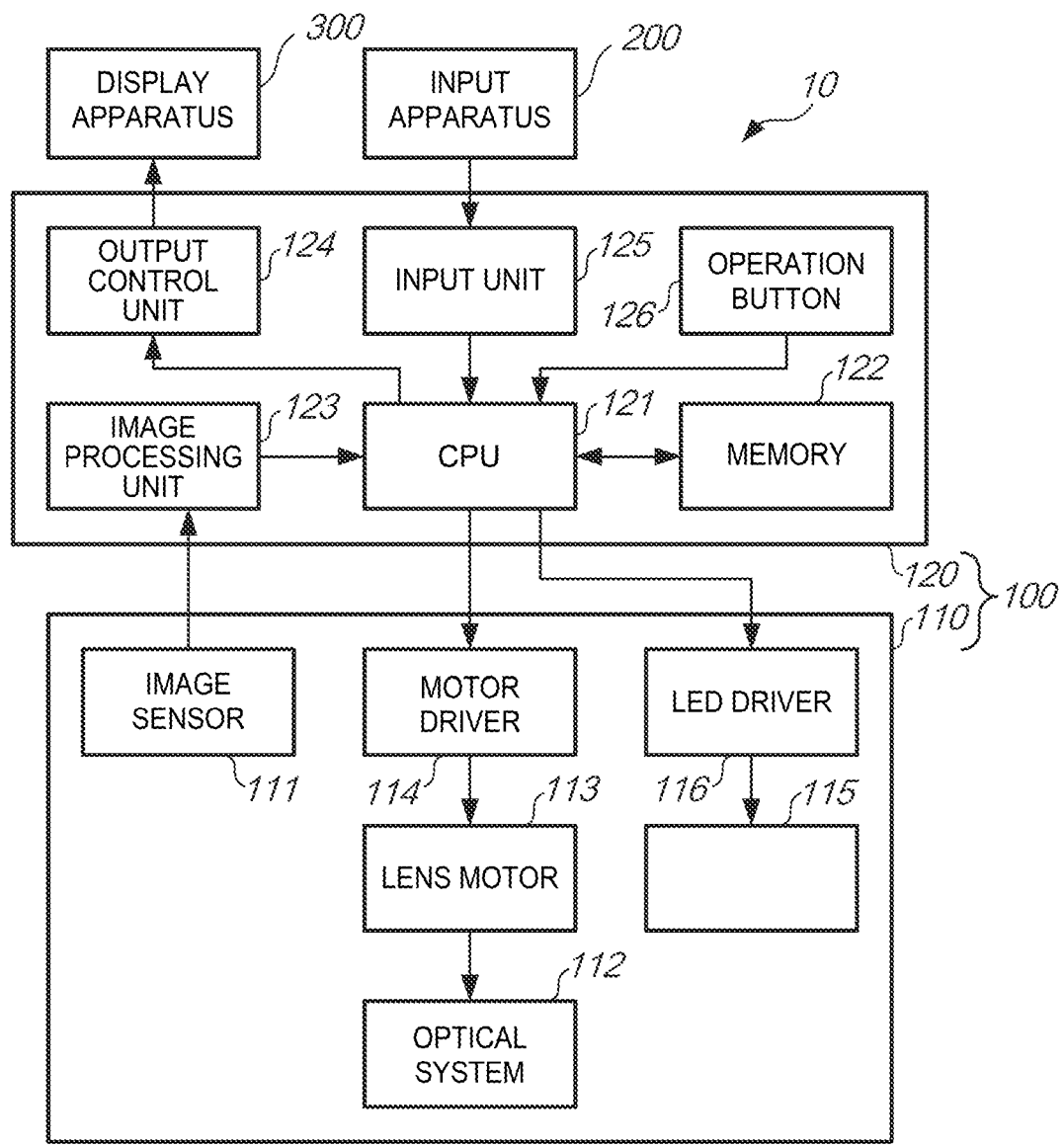
FIG. 1 is a block diagram showing an overall configuration of a display system.

FIG. 1 is a block diagram showing an overall configuration of a display system 10 according to an embodiment of the invention. The display system 10 is typically what is called an overhead camera. The display system 10 captures an image of a subject (manuscript, for example) placed in a predetermined position (on manuscript table, for example) from a predetermined imaging position and displays a captured image. The display system 10 includes an imaging apparatus 100, an input apparatus 200, and a display apparatus 300.

More specifically, the imaging apparatus 100 includes an imaging unit 110 and a control unit 120. The imaging unit 110 includes an image sensor 111, an optical system 112, a lens motor 113, a motor driver 114, an LED (light emitting diode) 115, and an LED driver 116. The imaging apparatus 100 is, for example, supported by an arm and captures an image of a subject from above (see JP-A-10-229515, for example).

The image sensor 111 is a sensor that converts light into an electric signal and is formed, for example, of a CCD (charge coupled device) image sensor or a CMOS (complementary metal-oxide semiconductor) image sensor. The optical system 112 is a member that forms an image on the image sensor 111 and is formed of lenses and mirrors. The lens motor 113 is a motor that moves one or more of the lenses that form the optical system 112 along the optical axis thereof. The motor driver 114 is an electronic circuit that drives the lens motor 113. The optical system 112, the lens motor 113, and the lens driver 114 form an optical zoom mechanism and achieve optical zooming. The LED (light emitting diode) 115 is an example of a light source that illuminates a subject. The LED 115 may be replaced, for example, with a fluorescent lamp. The LED driver 116 is an electronic circuit that drives the LED 115.

The control unit 120 includes a CPU (central processing unit) 121, a memory 122, an image processing unit 123, an output control unit 124, an input unit 125, and an operation button 126.

The CPU 121 executes a predetermined program to control the action of each of the portions in the imaging apparatus 100. The memory 122 includes volatile and nonvolatile storage media and stores data used by the CPU 121. The image processing unit 123 is a circuit that performs predetermined image processing on an image captured by the imaging apparatus 100. The output control unit 124 is an interface that controls image output to the display apparatus 300. The input unit 125 is an interface that accepts an input from the input apparatus 200. The operation button 126 is formed of a plurality of buttons that accept user's inputs.

The input apparatus 200 is an apparatus that inputs user's operation to the imaging apparatus 100. The input apparatus 200 is, for example, a pen-shaped input apparatus provided with a button but does not necessarily have a specific shape and may be any apparatus capable of specifying a position (coordinates). The input apparatus 200 may be wired to the imaging apparatus 100 or wirelessly connected thereto. In the following description, among inputs to the imaging apparatus 100, an input issued by user's operation is particularly called an "operational input."

The display apparatus 300 is an apparatus that displays an image captured by the imaging apparatus 100. It is assumed in the description that the display apparatus 300 is a projector that projects and displays an image on a screen or a wall surface. The display apparatus 300 is wired to the imaging apparatus 100 or wirelessly connected thereto.

The configuration of the display system 10 is as described above. The user uses the thus configured display system 10 to display a manuscript (such as document and photograph). In particular, the display system 10 is suitable for an application in which an enlarged image of an actual manuscript is displayed, and the display system 10 can readily project a manuscript on a large screen to allow a plurality of users to simultaneously check the manuscript.

The display system 10 has a zoom function. The zoom function of the display system 10 is achieved in the form of optical zooming and electronic zooming. In the description, the optical zooming is achieved by mechanically driving the imaging unit 110, and the magnification of an image is optically changed by moving a lens to change the focal length of the optical system. On the other hand, the electronic zooming digitally enlarges part of an image by carrying out an electronic zoom process that is part of the image processing performed by the image processing unit 123. Image enlargement based on the electronic zooming reduces the number of pixels, resulting in degradation in image quality as compared with image enlargement based on the optical zooming. The electronic zoom process used herein may, however, include interpolation for compensating the degradation in image quality due to the decrease in the number of pixels.

It can therefore be said that optical zooming is more advantageous than electronic zooming in terms of image quality. However, since the optical zooming is performed by moving a lens along the optical axis thereof, the center of an enlarged image (center of viewing angle) remains substantially unchanged. On the other hand, in electronic zooming, since an arbitrary portion of a captured image is cut and then enlarged, electronic zooming is performed based on no specific point, unlike optical zooming.

A zoom process in the present embodiment is characterized in that it is carried out in consideration of the difference in characteristic between the optical zooming and the electronic zooming. Specifically, the display system 10 first displays an image before enlargement. When accepting an input that specifies an output range (that is, range to be enlarged and displayed) of the image, the display system 10 performs the zoom process by carrying out the following two steps: an optical zoom magnification is so determined that an optically zoomed image contains the output range; and then an electronic zoom magnification is determined. The zoom process described above not only allows the center of the output range to differ from the center of the viewing angle unlike a case where only the optical zooming is used but also suppresses degradation in image quality as compared with a case where only the electronic zooming is used. It is noted that the input that specifies the output range is not necessarily limited to an operational input, that is, an input issued by user's operation and may be an input in the form of external data.

Figure 2:
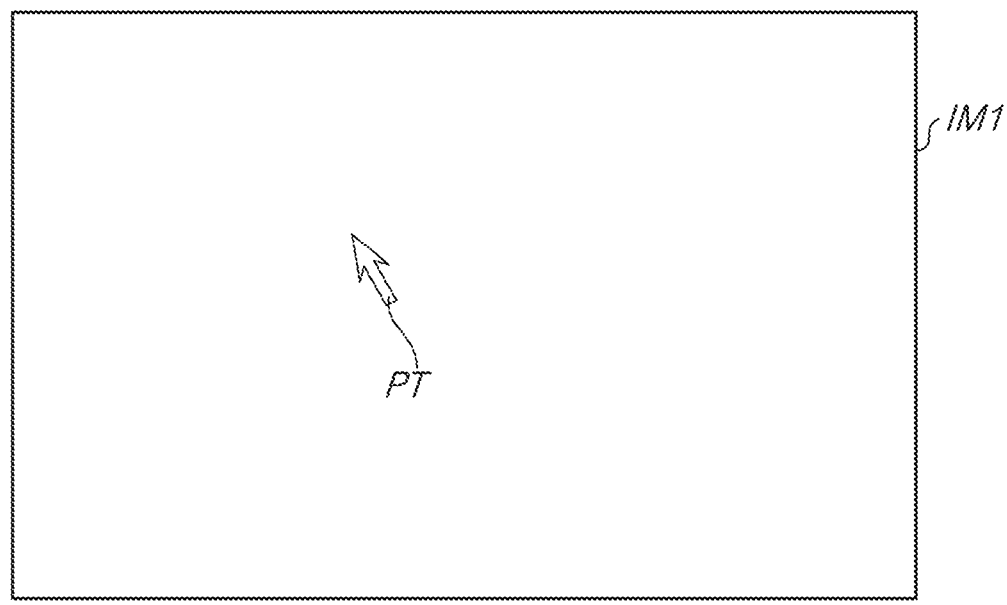
FIG. 2 shows an example of an image displayed when a zoom process is carried out.
Figure 3:
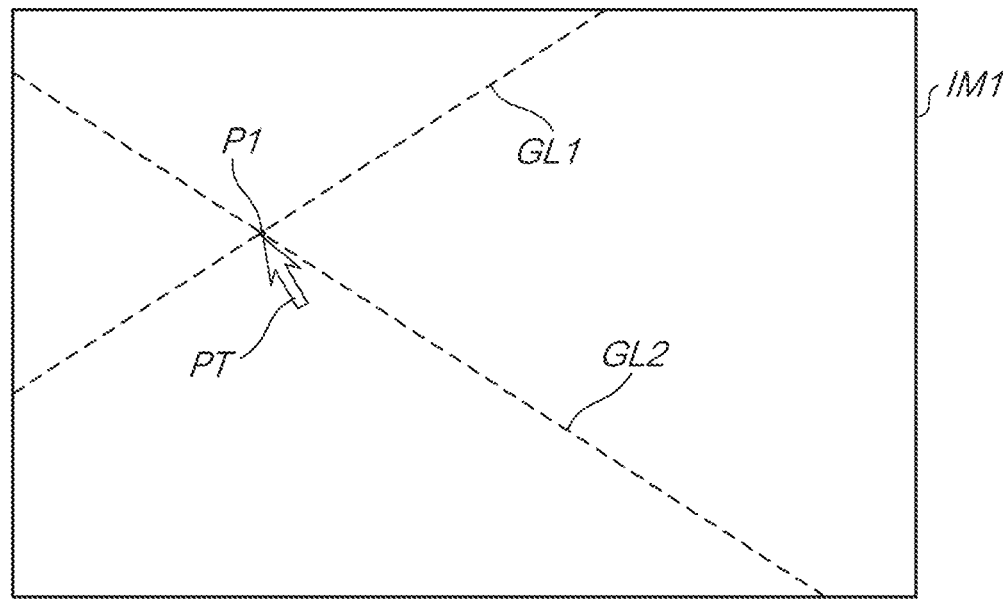
FIG. 3 shows an example of another image displayed when the zoom process is carried out.
Figure 4:
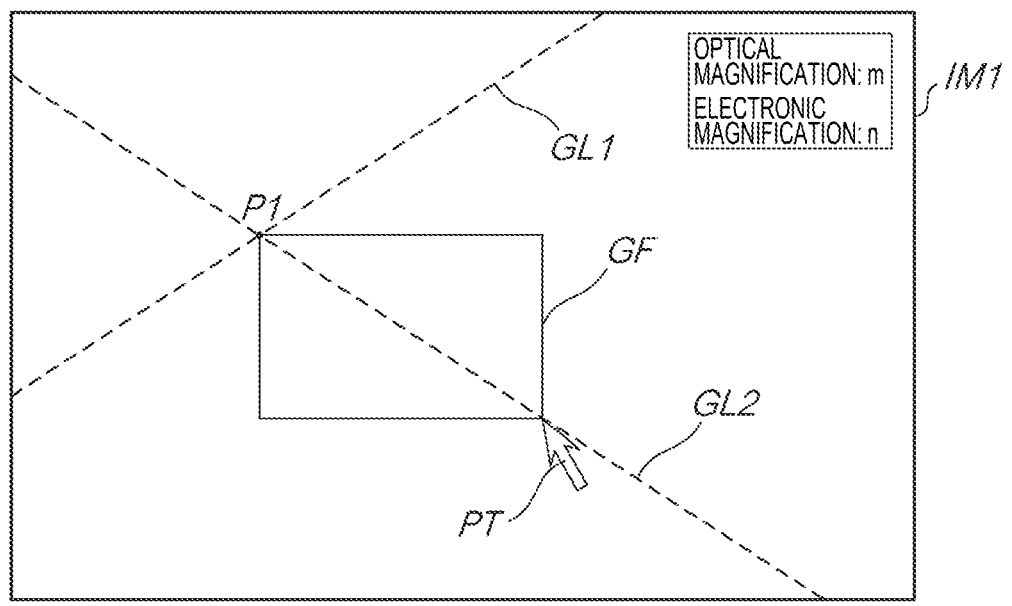
FIG. 4 shows an example of another image displayed when the zoom process is carried out.

FIGS. 2 to 4 show exemplary images displayed when the zoom process according to the present embodiment is carried out. FIG. 2 shows an example of an initial-state image displayed by the display apparatus 300. First, the display apparatus 300 displays an image representing a manuscript (hereinafter referred to as "original image") IM1 having a predetermined magnification and aspect ratio. In the following description, the magnification of the initial-state original image is called "1×" for convenience of description (it is, however, noted that the size of the original image is not necessarily equal to the size of the actual manuscript). The display apparatus 300 displays a pointer PT superimposed on the original image IM1. The pointer PT is an image representing the position pointed by the input apparatus 200. The pointer PT may be superimposed on the original image IM1 by the CPU 121 or the image processing unit 123.

The display apparatus 300 changes the position where the pointer PT is displayed in response to the movement of the input apparatus 200. That is, the pointer PT is so displayed that it tracks the movement of the input apparatus 200. In this process, when the user presses the button on the input apparatus 200, the display apparatus 300 carries out a process of determining the output range starting from the predetermined position.

FIG. 3 shows an example in which the user has specified a start point P1. After the start point P1 is specified, the display apparatus 300 displays guide lines GL1 and GL2. Each of the guide lines GL1 and GL2 is a straight line that passes through the start point P1 and is parallel to a diagonal of an area where the original image IM1 is displayed. The guide lines GL1 and GL2 serve as guidance when the user specifies the output range.

FIG. 4 shows an example in which the user moves the input apparatus 200 from the position thereof in the state shown in FIG. 3. When the input apparatus 200 is moved, the display apparatus 300 moves the pointer PT in accordance with the movement and displays a guide frame GF. The guide frame GF is an image representing a rectangle that passes the start point P1 and the position pointed by the pointer PT and has an aspect ratio equal to that of the area where the original image IM1 is displayed. The user specifies an end point with the aid of the guide lines GL1 and GL2 and the guide frame GF.

The display apparatus 300 may further display numerical values representing an optical zoom magnification (m times in this example) and an electronic zoom magnification (n times in this example) and superimposed on the original image IM1, as shown in an upper right portion of the original image IM1 in FIG. 4. The position where the numerical values are displayed is not limited to the upper right position of the original image IM1 and may be an appropriate position.

Figure 5:
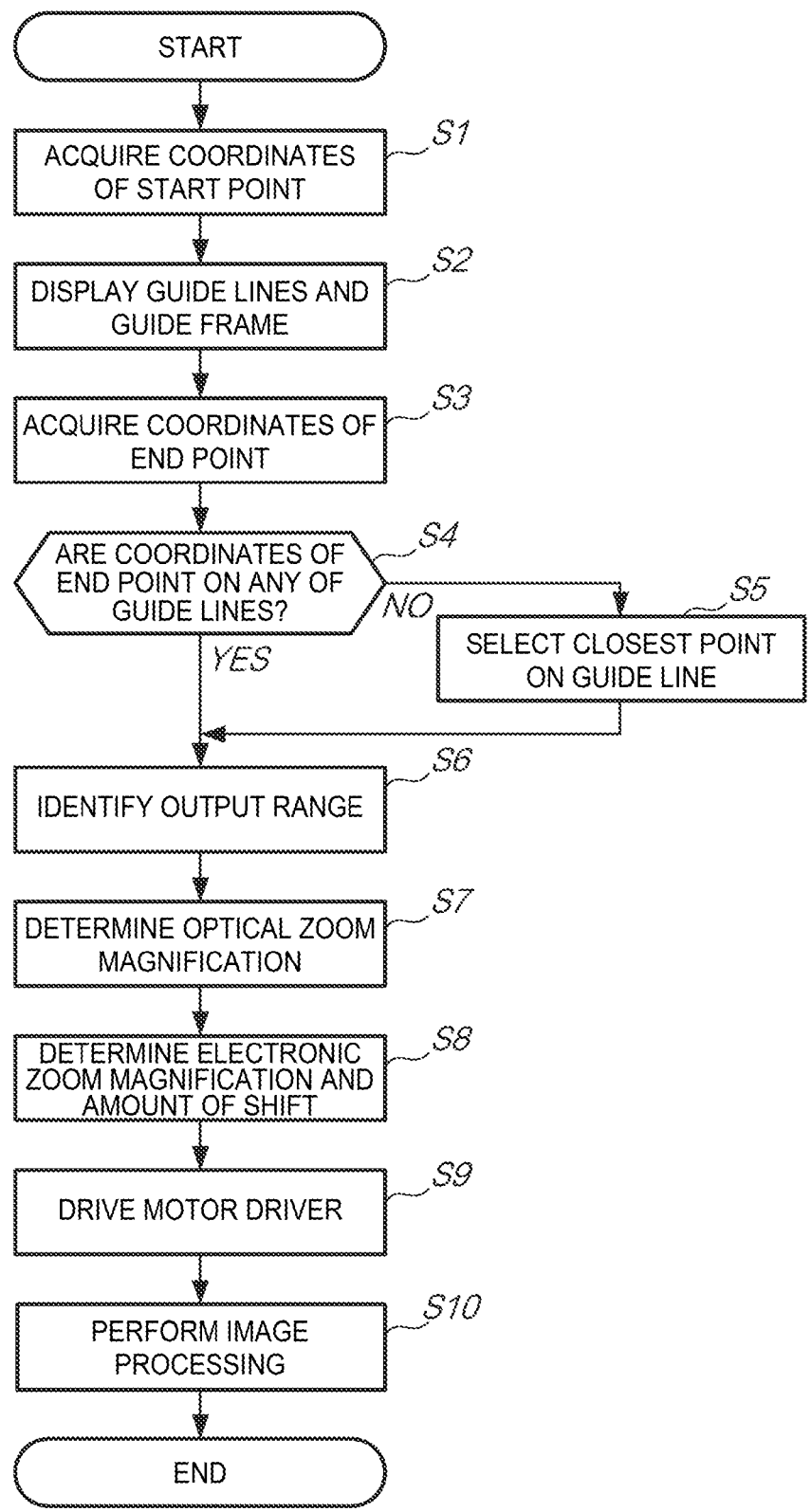
FIG. 5 is a flowchart showing processes carried out by a control unit.

FIG. 5 is a flowchart showing processes carried out by the control unit 120 in the zoom process according to the present embodiment. The control unit 120, when it acquires the coordinates of the start point in response to user's operation (step S1), causes the display apparatus 300 to superimpose the guide lines GL1 and GL2 and the guide frame GF on the original image IM1 and display the resultant image (step S2). The control unit 120 further acquires the coordinates of the end point in accordance with user's operation (step S3). As a result of the processes in steps S1 to S3, the display apparatus 300 displays the images shown in FIGS. 2 to 4. In the present embodiment, operational inputs that specify the coordinates of the start point and the coordinates of the endpoint correspond to an operational input that specifies the output range.

Having acquired the coordinates of the end point, the control unit 120 evaluates whether the coordinates of the end point are on any of the guide lines (step S4). When the evaluation shows that the end point does not have coordinates on any of the guide lines, a point that is on one of the guide lines and closest to the coordinates of the end point is selected as the end point (step S5). That is, in the present embodiment, the aspect ratio of the output range is always fixed. When the end point has coordinates on any of the guide lines, the control unit 120 does not carry out (skips) the process in step S5.

The control unit 120 identifies the output range of the image based on the coordinates of the start point and the coordinates of the endpoint acquired in steps S1 and S3 (step S6). Specifically, the control unit 120 sets the output range of the image to be a rectangle (oblong or square) having a diagonal that is a line segment connecting the coordinates of the start point to the coordinates of the end point.

The control unit 120 determines the optical zoom magnification based on the position of the thus identified output range (step S7). Specifically, the control unit 120 determines the optical zoom magnification based on the amount of deviation of the output range identified in step S6 from the center of the viewing angle of the imaging unit 110. Provided that the output range is fixed, the greater the optical zoom magnification determined at this point, the smaller the deviation from the center of the viewing angle. A specific method for determining the optical zoom magnification follows.

Figure 6:
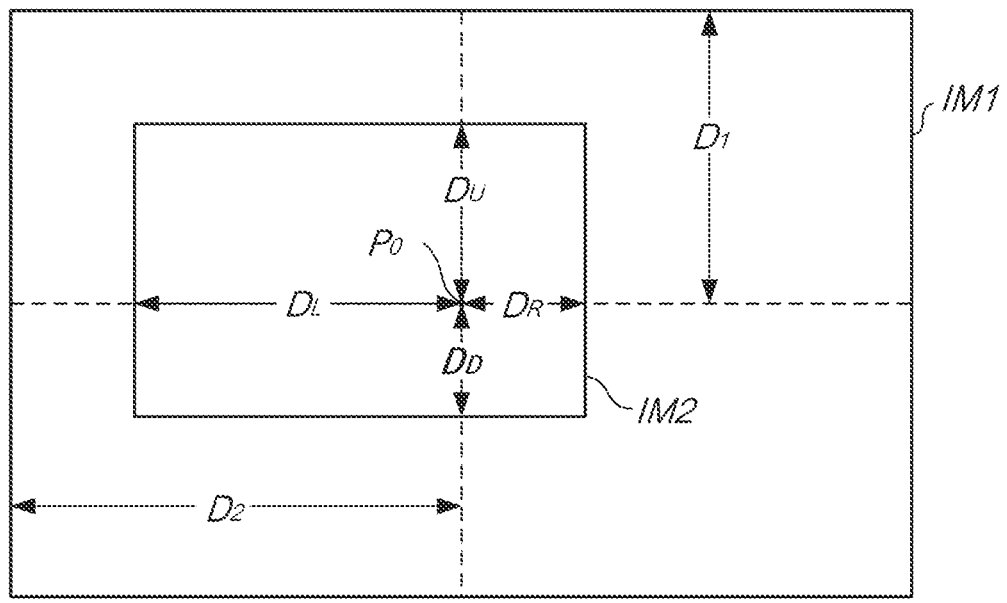
FIG. 6 describes a method for determining an optical zoom magnification.
Figure 7:
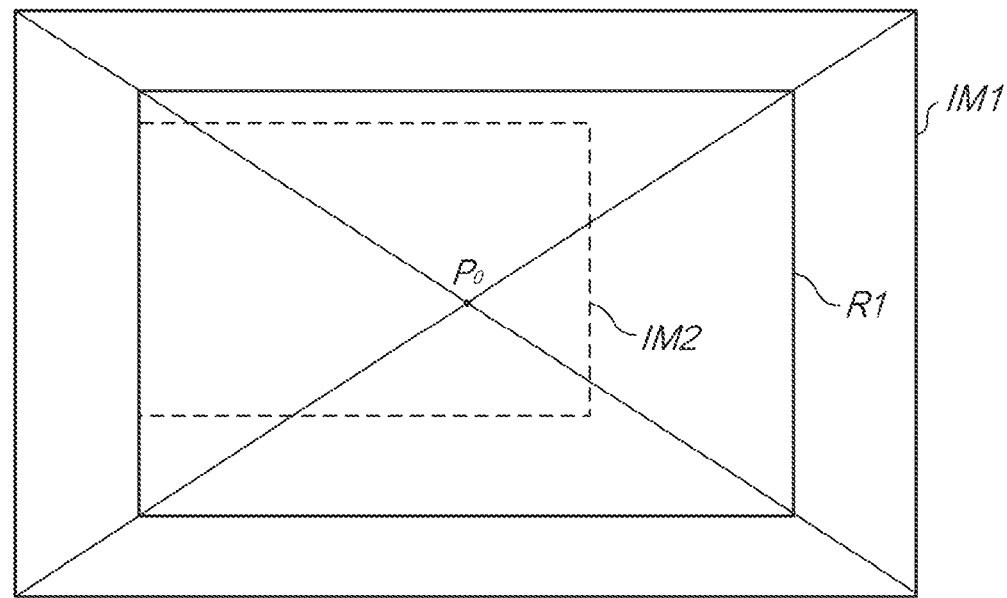
FIG. 7 describes the method for determining an optical zoom magnification.

FIGS. 6 and 7 describe the principle of the method for determining the optical zoom magnification. The description will be made with reference to a case where an image IM2 in the original image IM1 is enlarged and displayed. That is, the area where the image IM2 is displayed is a rectangle corresponding to the output range identified in step S6. Now, let $D_L$, $D_R$, $D_U$, and $D_D$ be the distances from the center of the viewing angle $P_0$ to the four sides of the rectangle, and let $D_1$ be the distance from the center of the viewing angle $P_0$ to the upper side (or lower side) of the original image IM1 and $D_2$ be the distance from the center of the viewing angle $P_0$ to the right side (or left side) of the original image IM1. The control unit 120 calculates the ratios of $D_L$, $D_R$, $D_U$, and $D_D$ to $D_1$ and $D_2$ (that is, $D_L/D_2$, $D_R/D_2$, $D_U/D_1$, $D_D/D_1$) and identifies a side where the ratio is maximized. In the case shown in FIG. 6, $D_L/D_2$ is the maximum ratio.

Having identified a side where the ratio described above is maximized, the control unit 120 determines the optical zoom magnification in such a way that the viewing angle covers a rectangle R1 that has a side that overlaps with the identified side and shares the diagonal of the original image IM1, as shown in FIG. 7. The rectangle R1 corresponds to a minimum viewing angle of those that can cover the entire image IM2. The optical zoom magnification set when the image IM2 is captured by using the minimum viewing angle is a maximum magnification of those that allow the entire image IM2 to be captured.

Having determined the optical zoom magnification as described above, the control unit 120 subsequently determines the electronic zoom magnification and the amount of shift of the center of the image IM2 (step S8). In this process, the amount of shift is the amount of deviation of the center of the image IM2 from the center of the viewing angle corresponding to the original image IM1 or the amount representing how much the center of the image IM2 deviates from the center of the viewing angle corresponding to the original image IM1. The electronic zoom magnification can be uniquely determined from the difference between the optical zoom magnification and the magnification by which the image IM2 is so enlarged that the size thereof is equal to the size of the original image IM1.

Having carried out the processes in steps S7 and S8, the control unit 120 can determine a condition to be applied to the imaging (imaging condition) and a condition to be applied to the image processing (image processing condition). The control unit 120 drives the motor driver 114 in such a way that the imaging is performed under the thus determined imaging condition (step S9) and controls the image processing unit 123 in such a way that the image processing (electronic zoom process, in particular) is performed under the thus determined image processing condition (step S10).

According to the present embodiment described above, an image produced by enlarging a portion around an arbitrary position in an original image can be displayed with a small amount of degradation. That is, according to the present embodiment, the advantage of optical zooming and the advantage of electronic zooming are combined with each other, and an image can be displayed by using both the advantages. The user therefore does not need to move the imaging unit 110 (in a direction perpendicular to the optical axis thereof) but can display an enlarged image of at least a certain level of image quality.

Variations

The invention is not limited to the embodiment described above and can be implemented in a variety of aspects described below by way of example. The invention can also be implemented as required in the form of a combination of a plurality of the variations described below.

(1) In the imaging apparatus 100, the optical zoom magnification may be continuously changed or may be changed stepwise over a predetermined range. The term "stepwise" used herein means that when the optical zoom magnification changes, for example, from 1× to 6×, only predetermined magnifications, such as 1×, 2×, 3×, 4×, and 6×, can be set and the other magnifications (1.5×, for example) cannot be set.

Figure 8:
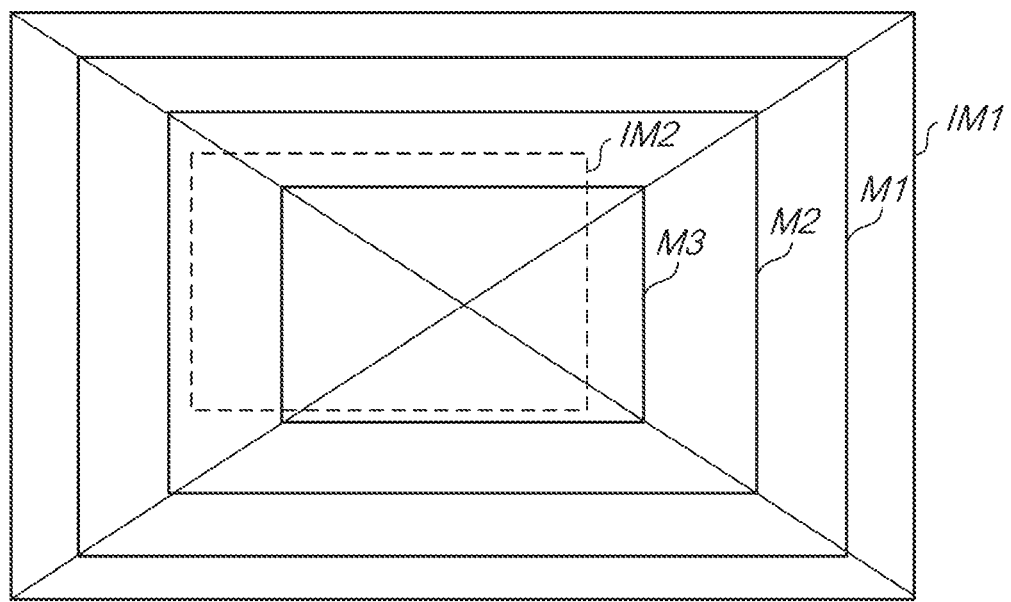
FIG. 8 describes the method for determining an optical zoom magnification.

FIG. 8 describes the method for determining the optical zoom magnification in a case where the optical zoom magnification changes stepwise. The description will be made of a case where the image IM2 is specified as the output range of the original image IM1 and a first magnification M1, a second magnification M2, and a third magnification M3 can be set as the optical zoom magnification. In this case, there are a plurality of combinations of the optical zoom magnification and the electronic zoom magnification that can specify a predetermined magnification by which the image is enlarged. For example, the optical zoom magnification by which the image IM2 in the original image IM1 is enlarged before displayed may be the first magnification M1 or the second magnification M2. When the optical zoom magnification is set at the first magnification M1, however, the electronic zoom magnification needs to be greater than in a case where the optical zoom magnification is set at the second magnification M2.

In this case, among the combinations of the optical zoom magnification and the electronic zoom magnification that can specify a predetermined magnification by which the image is enlarged, the control unit 120 enlarges the image by using the combination including a maximum optical zoom magnification. In the case shown in FIG. 8, among the optical zoom magnifications that allow the entire image IM2 to be captured, the second magnification M2 is the maximum optical zoom magnification. In other words, among the combinations of the optical zoom magnification and the electronic zoom magnification that can specify a predetermined magnification by which the image is enlarged, the control unit 120 enlarges the image by using the combination including a minimum electronic zoom magnification.

(2) The aspect ratio of an enlarged image is not necessarily equal to the aspect ratio of an original image. That is, the imaging apparatus 100 may be configured to accept an input that specifies an output range having an aspect ratio different from that of an original image. In this case, the imaging apparatus 100 may enlarge and display an image with margins provided next to the image in the vertical or horizontal direction. In this case, no guide lines or guide frame is essentially required.

(3) The display apparatus 300 is not limited to a projector. For example, the display apparatus 300 may instead be a liquid crystal display of a personal computer or any other apparatus or may be a television receiver. Further, the imaging apparatus 100 may instead, for example, be a digital still camera or an image scanner. Moreover, the imaging apparatus 100 and the display apparatus 300 may instead be an integrated apparatus, such as a tablet terminal with a camera. Similarly, the input apparatus 200 may instead be integrated with the imaging apparatus 100 or the display apparatus 300 and may have a structure other than the pen-shaped structure (mouse, for example).

(4) The invention can be implemented not only as an imaging apparatus but also as a display system including the imaging apparatus or a method for controlling the imaging apparatus. Further, the invention can be implemented in the form of a program that causes a computer to function as the imaging apparatus according to the embodiment of the invention. The program according to an embodiment of the invention may be supplied to the imaging apparatus over a network or via any other communication apparatus and installed in the imaging apparatus for use.

Further, the invention is not limited to an apparatus that captures an image of a manuscript. The invention is applicable to general applications in which an image of a predetermined subject is captured from a predetermined imaging position and part of the image of the subject is enlarged and displayed as required. For example, the invention is also applicable to a case where an image of a predetermined location, such as a facility, is captured with a monitoring camera and the captured image is remotely monitored.

What is claimed is:

1. An imaging apparatus comprising:
an imaging unit having an optical zoom mechanism that optically changes magnification and capturing an image;
an image processing unit that performs image processing including an electronic zoom process that enlarges part of the image captured with the imaging unit by cutting the image;
an input unit that accepts an input that specifies an output range of the image; and
a control unit that controls each of the imaging unit and the image processing unit,
wherein when the output range is specified, the control unit causes the imaging unit to perform imaging at a magnification determined in accordance with the amount of deviation of the output range from the center of a viewing angle of the imaging unit and causes the image processing unit to carry out the electronic zoom process that enlarges the image by cutting the output range from an image captured at the magnification.

2. The imaging apparatus according to claim 1,
wherein among combinations of an optical zoom magnification and an electronic zoom magnification that specify a predetermined magnification by which the image is enlarged, the control unit controls each of the imaging unit and the image processing unit by determining a combination that maximizes the optical zoom magnification.

3. The imaging apparatus according to claim 1,
wherein among combinations of an optical zoom magnification and an electronic zoom magnification that specify a predetermined magnification by which the image is enlarged, the control unit controls each of the imaging unit and the image processing unit by determining a combination that minimizes the electronic zoom magnification.

4. The imaging apparatus according to claim 1,
further comprising an output control unit that outputs an image superimposing a pointer that allows acceptance of the input on the image captured with the imaging unit.

5. A method for controlling an imaging apparatus including
an imaging unit having an optical zoom mechanism that optically changes magnification and capturing an image, and
an image processing unit that performs image processing including an electronic zoom process that enlarges part of the image captured with the imaging unit by cutting the image, the method comprising:
accepting an input that specifies an output range in an image displayed at a predetermined magnification;
determining an optical zoom magnification in the imaging unit, after the output range is specified, in accordance with the amount of deviation of the output range from the center of a viewing angle of the imaging unit;
determining an electronic zoom magnification in the image processing unit in accordance with the determined optical zoom magnification; and
controlling each of the imaging unit and the image processing unit so that the capturing is performed at the determined optical zoom magnification and the enlargement is performed at the determined electronic zoom magnification.

* * * * *